United States Patent Office 2,881,200
Patented Apr. 7, 1959

2,881,200
METHOD FOR PREPARING ESTERS OF DI(OR-
GANO) PHOSPHINODITHIOIC ACIDS

Willis G. Craig, Willoughby, and Clark O. Miller, Cleveland, Ohio, assignors to The Lubrizol Corporation, Wickliffe, Ohio, a corporation of Ohio No Drawing. Application January 26, 1954
Serial No. 406,324

9 Claims. (Cl. 260—461)

This invention is directed to organic phosphinodithioates (dithiophosphinates). More particularly it relates to new esters of dithiophosphonic acids and processes for their preparation.

Compounds which contain appreciable quantities of phosphorus and sulphur within their molecule structure are in general quite useful as lubricating oil adjuvants. Such compounds, when added in small proportions to a lubricating oil, impart extreme-pressure properties and tend to diminish the decomposition and subsequent corrosive properties of said lubricating oil, and consequently these compounds have been used extensively throughout the broad field of lubrication. The dithiophosphinic acid esters which are a subject of the invention, possess relatively large proportions of chemically combined phosphorus and sulphur, and thus these compounds as a class have desirable properties as extreme-pressure agents and as corrosion inhibitors and oxidation inhibitors for lubricating oils. These esters are also useful in the field of insecticides, pest-control, etc., and other obvious applications reside in their properties as ore flotation agents, rubber accelerators, etc.

The preparation of esters of carboxylic acid by the reaction of an acid with an alcohol is a well-known reaction which requires a catalyst such as HCl, $H_2SO_4$, and proceeds by a mechanism in which the oxygen of the acid hydroxyl group is replaced by the oxygen of the alcohol. The known methods of preparation of esters of phosphinic acid include the reaction of esters of phosphonous acid with organic halides and the reaction of silver salts of phosphinic acids with alkyl iodides.

It is, therefore, an object of this invention to provide new and useful esters of dithiophosphinic acids.

It is a further object of this invention to provide a process for the preparation of esters of phosphinodithioic acids which does not require the use of any catalysts.

Other objects and advantages will become apparent as the description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention relates to the esters of di-aromatic phosphinodithioic acids, in which the aromatic radicals are attached to phosphorus through a benzenoid carbon atom, as new chemical compounds. These new chemical compounds can be prepared by the process of this invention whereby a phosphinodithioic acid is allowed to react with an alcohol at elevated temperatures. The term "alcohol" as used in the specification and appended claims is intended to include both monohydric and polyhydric alcohols.

More particularly, the invention relates to the organic dithio-esters of phosphinodithioic acid, as new chemical compounds, having the formula:

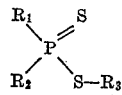

wherein $R_1$ and $R_2$ are organic radicals attached to the phosphorus through a benzenoid carbon atom and $R_3$ is a non-benzenoid hydrocarbon radical. $R_1$ and $R_2$ are preferably aromatic hydrocarbon radicals such as phenyl, naphthyl, xenyl, tolyl, biphenyl, and the alkyl and cycloalkyl substituted products of these, such as, diisobutyl-substituted-phenyl, diisobutyl-substituted tolyl, triisobutyl-substituted phenyl, wax-substituted phenyl, polydodecyl phenyl, polydodecyl naphthyl, etc; and most desirably those compounds in which $R_1$ and $R_2$ are aryl radicals attached to the phosphorus through a benzenoid carbon atom. $R_3$ in the above formula is preferably an aliphatic or cycloaliphatic hydrocarbon radical, and most desirably an alkyl radical from one to thirty carbon atoms. Suitable examples of the foregoing dithio-esters of phosphinodithioic acid are methyl diphenylphosphinodithioate, methyl ditolylphosphinodithioate, methyl di-(amylphenyl) phosphinodithioate, methyl phenyltolylphosphinodithioate, isobutyl diphenylphosphinodithioate, isobutyl ditolylphosphinodithioate, isobutyl di-(amyl phenyl) phosphinodithioate, isobutyl phenyltolylphosphinodithioate, isobutyl di-(waxphenyl) phosphinodithioate, octyl diphenylphosphinodithioate, octyl ditolylphosphinodithioate, octyl dixylylphosphinodithioate, octyl di-(waxphenyl) phosphinodithioate, dodecyl diphenylphosphinodithioate, dodecyl ditolylphosphinodithioate, dodecyl dixylylphosphinodithioate, dodecyl phenyltolylphosphinodithioate, cyclohexyl diphenylphosphinodithioate, etc.

The process of this invention relates to method for preparing dithio-esters of phosphinodithioic acid which comprises the steps of reacting:

(a) At least one phosphinodithioic acid having the following structure:

wherein $R_1$ and $R_2$ are organic radicals attached to phosphorus through a benzenoid carbon atom; with (b) At least one alcohol;

in such proportions as to cause the reaction to proceed at a reasonable rate and under such conditions and for a length of time such that the acidity of the mass is substantially reduced.

The esterification reaction involving a carboxylic acid and an alcohol has long been known to proceed according to the mechanism:

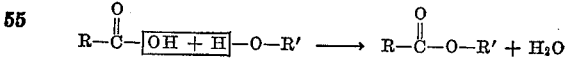

Thus, the carbon to oxygen bond in the alcohol residue remains intact throughout the reaction, and the oxygen which appears in the water molecule, comes from the carboxylic acid residue. Analogously, the esterification of phosphinodithioic acid would be expected to proceed in the same manner, —SH being split off from the acid and H from the alcohol or mercaptan:

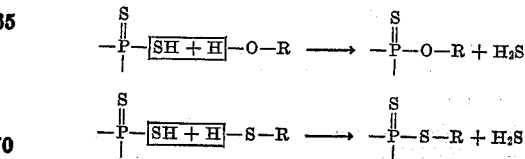

Only the latter of course would yield the dithio-esters of phosphinodithioic acids. Such a method would be inherently costly, because of the high cost of most mercaptans. The use of low-cost alcohols as raw materials would appear to be out of the question in view of the above illustrated mechanism.

We have discovered, however, that unexpectedly the mechanism of esterification as applied to the esterification of phosphinodithioic acids does not follow the path shown in the previous illustrations. We have found, for example, that in the esterification of phosphiodithioic acids with alcohols, both sulphur atoms are retained in the molecule of the ester product. This discovery has great significance for it allows the syntheses of dithio-esters directly from phosphinodithioic acids using cheap, readily available alcohols. The equation below illustrates the reaction:

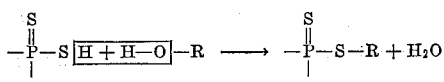

PHOSPHINODITHIOIC ACIDS EMPLOYED IN THE PROCESS

The particular phosphinodithioic acids which may be employed in the process of this invention are the organic phosphinodithioic acids which may be more exactly defined by the following structure:

wherein $R_1$ and $R_2$ are the same or different aromatic radicals attached to phosphorus through a benzenoid carbon atom, and preferably aromatic hydrocarbon radicals, including aryl radicals.

Examples of aromatic radicals are organic radicals containing at least one resonant ring structure, such as, benzene, naphthalene, anthracene, phenanthrene, naphthacene, chrysene, pyrene, triphenylene, biphenyl, and terphenyl radicals, and the substitution products of these such as their alkylation products, halogenation products, nitration products, etc. Examples of the alkylation products include cresyl, xylyl, mesitylene, di-ethyl phenyl, isopropyl phenyl, n-propyl phenyl, tert.-butyl phenyl, di-tert-butyl phenyl, iso-butyl phenyl, n-butyl phenyl, tert-amyl phenyl, cyclohexyl phenyl, methylcyclohexyl phenyl, capryl phenyl, diisobutyl phenyl, bis-(di-isobutyl) phenyl, lauryl phenyl, cetyl phenyl, paraffin wax substituted phenyl, dodecyl phenyl, di-dodecyl phenyl, etc. Examples of halogenation products include mono-chloro-phenyl, di-chloro-phenyl, tri-chloro-phenyl, bromo-phenyl, mono- and poly-chloro xenyl, mono- and poly-chloro-naphthyl, mono- and poly-chloro-anthracyl, methyl-chloro-phenyl, ethyl-chloro phenyl, ethyl-chloro-anthracyl, etc. Examples of nitro products include nitro-benzene, nitro-xenyl, methyl-nitro-phenyl, butyl-nitro-phenyl, etc.

The organic phosphinodithioic acids used as starting materials in the process can be prepared by the reaction of Grignard reagents with phosphorus pentasulfide (see Organophosphorus Compounds, G. M. Kosolapoff, p. 135, John Wiley & Sons, New York, 1950). A representative method for the preparation of organic phosphinodithioic acids is described in the co-pending application of Miller et al., for "Organic Phosphinodithioic Compounds and Methods for Preparing Same," Ser. No. 406,323 filed January 26, 1954, and owned by the same assignee.

ALCOHOLS EMPLOYED IN THE PROCESS OF THE INVENTION

The alcohols which are suitable for the preparation of the dithio-esters of phosphinodithioic acid include the various monohydric and polyhydric aliphatic, arylaliphatic, and cycloaliphatic alcohols. Such aliphatic, arylaliphatic and cycloaliphatic alcohols may contain substituent groups such as, e.g., phenyl, naphthyl, chloro, bromo, and nitro groups. Suitable alcohols, include for example, methanol, ethanol, ethylene glycol, propanol, glycerol, butanol, butylene glycol, pentanol, pentamethylene glycol, pentaerythritol, hexanol, heptanol, octanol, nonanol, decanol, chloro-decanol, dodecanol, hexadecanol, heptadecanol, heptadecenol, cyclopropanol, cyclohexanol, cyclohexandiol-1,4, methyl-cyclohexanol, methyl chlorocyclohexanol, propyl cyclohexanol, butyl cyclohexanol, amyl cyclohexanol, propyl cyclohexanol, propyl nitrocyclohexanol, butyl cyclohexanol, amyl cyclohexanol, cyclohexyl cyclohexanol, cycloheptanol, furfuryl alcohol, tetrahydrofurfuryl alcohol, benzyl alcohol, B-phenethyl alcohol, xylyl alcohols, etc. The alcohols which are employed generally will contain from 1 to about 30 carbon atoms; preferably the alkyl and cycloalkyl alcohols, and most desirably the alkyl alcohols.

PROCEDURE

The reaction of an organic phosphinodithioic acid with an alcohol is effected by heating a mixture of the two at a temperature of 50° C. or higher depending upon the alcohol employed. No catalyst is necessary, and this fact contributes another unexpected advantage to the process of the invention.

The temperature of the reaction may, as stated previously, be as low as 50° C., and it may also, in some cases, be as high as 200° C. The lower alcohols are utilized most efficiently at their reflux temperature. It may be stated as general rule of practice that the most convenient operating temperature for the esterification of an organic phosphinodithioic acid and an alcohol is the reflux temperature of the reaction mixture or 200° C., whichever happens to be lower. The formation of by-products is a factor in the selection of an optimum temperature for the esterification reaction of this invention. One such class of by-products are the phosphinic acids, and the upper limit of temperature of 200° C., mentioned above, seems to be the approximate temperature above which the formation of these by-product phosphinic acids is observed to take place. Presumably, the phosphinic acid arises from phosphinodithioic acid, and the conversion is effected according to the equation $$R_2PSSH + 2H_2O \rightarrow R_2POOH + 2H_2S$$

by the presence of water which, of course, is a by-product of the principal reaction. The preceding explanation for the incidental formation of phosphinic acids during the high-temperature esterification of phosphinodithioic acids is not necessarily reliable, but it does fit the observed facts fairly well.

In any event, formation of this organic phosphinic acid occurs at the expense of the yield of ester and so it is, for purposes of this invention, to be avoided. It can be avoided as pointed out earlier, viz. by carrying out the esterification at a sufficiently low temperature.

Lower temperatures do not, in all cases, diminish the problem of by-products. In some instances an anhydride type of structure may be produced, and the formation of this structure, while not fully understood, does not occur to any significant extent under the reaction conditions. The anhydride structure itself is not definitely established and may be either of the following:

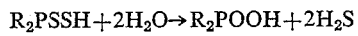

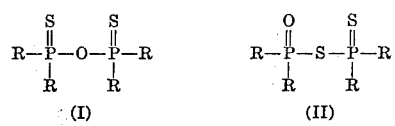

The structure shown in (I) would seem to be the more likely. The production of these anhydrides does not attend all esterification reactions, nor does it appear to be predictable. Thus in the esterification of diphenyl-phosphinodithioic acid with octanol-1 there is barely a trace of such an anhydride in the product mixture whereas in the case of a similar esterification with octanol-2 as much as 22 percent of the theory of such an anhydride can be isolated.

In any event the incidental formation of this anhydride structure or of any other by-product compound, whether of identifiable or unidentifiable structure, has not been observed to account for a sufficient proportion of the product mixture so as to detract materially from the value of this process as a means for preparing phosphinodithioate esters. The formation of the anhydride structure may in some instances account for 15 to 20 percent of the dithiophosphinic acid starting material, but in all experiments conducted the yields of phosphinodithioate esters have been good.

The formation of the anhydride, in any particular case, is not understood, although two possible mechanisms can be presented. They are:

I. $2R_2PSSH + ROH \rightarrow (R_2PS)_2O + RSH + H_2S$
II. $2R_2PSSH + H_2O \rightarrow (R_2PS)_2O + 2H_2S$ The mechanism shown in (I) seems less plausible than that shown in (II), and the latter is not entirely feasable in view of the fact that water is an essential reactant and the temperature of the reaction is in the neighborhood of 150° C. to 200° C. It may well be that the reaction actually proceeds by a third and presently unknown mechanism.

Regardless of the actual structure of the anhydride referred to previously or the mechanism by which it or any of the other products arises, we do not wish to limit our invention by virtue of any of the structures or mechanisms postulated herein. Such structures and mechanisms have been suggested solely for purposes of aiding and advancing the art.

The stoichiometry of the equation which represents the process of this invention implies a ratio of reactants of 1:1, i.e., one mole of phosphinodithioic acid to one mole of alcohol. This ratio is the most convenient if the matter of cost is overlooked, but a practical consideration will make it apparent that a molar excess of the cheapest component should be employed. In this case the alcohol will almost always be substantially cheaper than the phosphinodithioic acid and as a consequence it will frequently be desirable to use a molar excess of alcohol.

The time required for the esterification of organic phosphinodithioic acids according to the ordinary practice of this invention, varies throughout a wide range, depending upon the alcohol used and the temperature of the esterification reaction mixture. Six hours is a sufficient time for some esterifications whereas others require sixteen hours or more. Esterification of diphenylphosphinodithioic acid with octanol-2 at a temperature of 180° C. requires but six hours for the completion of the reaction, while the same reaction at a temperature of 155° C. requires sixteen hours. Esterification of the same acid with methanol at reflux temperature (64° C.) is complete in sixteen hours.

Those esterifications which are substantially complete within a short period of time are not adversely affected if they are maintained at reaction conditions for a longer period of time. Furthermore, those lower boiling alcohols whose boiling points do not allow the esterifications to proceed at a high (e.g. above 100° C.) temperature at atmospheric pressure, may be used at superatmospheric pressures and correspondingly higher reaction temperatures to give good yields of phosphinodithioate esters in shorter periods of time than would otherwise be required.

The progress of the reaction can be followed very conveniently by periodic observation of the acid number. The theoretical acid number for pure diphenylphosphinodithioic acid, for example, is 224, although the presence of non-acidic impurities generally reduces this value to about 215. In the esterification of this particular acid with octanol-1 the acid number will fall, rapidly at first, then more slowly, until it reaches a value close to zero, generally less than five. At this point the reaction is considered to be substantially complete.

The working up of the esterification reaction mixture comprises usually filtration of the cooled mixture (if the solid by-product anhydride is formed), washing of the filtrate with an alkaline solution, drying, and finally evaporation of the dried solution to remove unreacted alcohol. The residue from this evaporation is substantially pure as indicated by elementary analysis.

The broad principles of the invention having been set forth, the following examples are presented to exemplify the more specific embodiments thereof.

*Example 1*

A mixture of 125 grams (0.5 mole) of diphenylphosphinodithioic acid and 162.5 grams (1.25 moles) of octanol-2 was heated at 180° C. for six hours, then allowed to cool to room temperature. The mixture was filtered, and the solid, washed with petroleum ether and crystallized from a mixture of benzene and isopropanol, was shown by elementary analysis to contain one atom of sulphur per atom of phosphorus, indicating an anhydride structure. It weighed 18 grams (16 percent of the theory). The filtrate was washed with five percent aqueous sodium carbonate solution, then with water, then it was dried over anhydrous magnesium sulphate. The dried solution was freed of alcohol by evaporation at 150° C./0.1 mm. The residual liquid was identified via elementary analysis as octyl diphenylphosphinodithioate. It weighed 143 grams (79 percent of the theory).

*Example 2*

A mixture of 125 grams (0.5 mole) of diphenylphosphinodithioic acid and 195 grams (1.5 moles) of octanol-2 was heated at 155° C. for 16 hours, then allowed to cool to room temperature and filtered. The solid anhydride was washed with petroleum ether, then dried; yield 25 grams (22 percent of the theory). The filtrate was washed with five percent sodium carbonate and water, then dried over anhydrous magnesium sulphate. The dried solution was freed of alcohol by evaporation at 140° C./0.2 mm. leaving a residue of 139 grams (77 percent of the theory) of octyl diphenylphosphinodithioate.

*Example 3*

A mixture of 250 grams (1.0 mole) of diphenylphosphinodithioic acid and 260 grams (2.0 moles) of octanol-1 was heated at 185° C. for six hours, then allowed to cool to room temperature. The product mixture was washed with five percent sodium, carbonate and water, dried over anhydrous magnesium sulphate and finally freed of alcohol by evaporation at 150° C./0.5 mm. The residual liquid, shown by elementary analysis to be octyl diphenylphosphinodithioate, weighed 340 grams (94 percent of the theory).

*Example 4*

A mixture of 37 grams (0.15 mole) of diphenylphosphinodithioic acid and 120 grams (3.75 moles) of methanol was heated at reflux temperature for 16 hours, then allowed to cool to room temperature. The product mixture was filtered and the solid methyl diphenylphosphinodithioate which weighed 38 grams (97 percent of the theory) was purified by crystallization from petroleum ether.

*Example 5*

A mixture of 62.5 grams 0.25 mole) of diphenylphosphinodithioic acid and 79 grams (1.07 mole) of tert-butyl alcohol was heated at reflux temperature for 12 hours then freed of unreacted alcohol by evaporation at reduced pressure. The residual liquid was poured into 200 ml. of five percent aqueous potassium hydroxide and the resulting solid was collected on a filter. This solid was crystallized from isopropanol, yielding 55 grams (73 percent of the theory) of tert-butyl diphenylphosphinodithioate.

Example 6

A mixture of 125 grams (0.5 mole) of diphenylphosphinodithioic acid and 237 grams (1.5 moles) of 1-decanol was heated at 180° C. for ten hours, then was allowed to cool to room temperature and filtered. The solid anhydride weighed 2.4 grams (two percent of the theory). The filtrate was washed with five percent aqueous sodium carbonate and with water, then dried over anhydrous magnesium sulphate. The dried solution was freed of alcohol by evaporation at 150° C./0.2 mm. The residual liquid n-decyl diphenylphosphinodithioate weighed 174 grams (89 percent of the theory).

Example 7

A mixture of 1065 grams (3.3 moles) of di-(chlorophenyl) phosphinodithioic acid and 780 grams (6.0 moles) of 2-ethylhexanol was heated at reflux temperature (190–200° C.) for nine hours, then allowed to cool. The cooled mixture was filtered and the filtrate was concentrated at 165° C./3 mm. to a viscous, foul-smelling liquid, substantially pure 2-ethylhexyl di-(chloro-phenyl) phosphinodithioate, which was shown by elemental analyses to have a sulphur content of 13.2 percent (theory, 14.8 percent), a phosphorus content of 6.7 percent (theory, 7.2 percent) and a chlorine content of 16.8 percent (theory, 16.4 percent).

Example 8

A mixture of 125 grams (0.5 mole) of diphenylphosphinodithioic acid and 279 grams (1.5 moles) of 1-dodecanol was heated at 160° C. for ten hours, then allowed to cool. The cooled mixture was filtered and the filtrate was washed with ten percent aqueous sodium carbonate and water, and then dried with anhydrous magnesium sulphate. The dried solution was concentrated at 150° C./0.2 mm. and the residue was distilled, yielding 200 grams (95 percent of the theory) of a colorless, slightly viscous liquid which was identified as the 1-dodecyl ester of diphenyldithiophosphinic acid by elemental analyses.

Example 9

A mixture of 1650 grams (2.2 moles) of ditolylphosphinodithioic acid and 1300 grams (10.0 moles) of 2-ethylhexanol was heated at reflux temperature (185–190° C.) for 15 hours, then allowed to cool. The cooled product was filtered and the filtrate was washed with five percent aqueous sodium carbonate and water and then concentrated to a residue which upon distillation yielded 512 grams (60 percent of the theory) of a light orange, slightly viscous liquid. This liquid was shown to be 2-ethylhexyl ditolylphosphinodithioate by elementary analyses: sulphur, 16.4 percent (theory 16.4 percent); phosphorus, 7.6 percent (theory 7.9 percent).

Example 10

A mixture of 25 grams (0.1 mole) of diphenylphosphinodithioic acid and 100 ml. (1.0 mole) of 2-methyl-pentanol-4 was heated at 135° C. for 32 hours, then cooled and washed with aqueous sodium bicarbonate. The washed organic solution was dried and concentrated at 140° C./0.2 mm. to a residual liquid which upon distillation yielded 16 grams (48 percent of the theory) of a colorless liquid boiling at 175° C./0.2 mm. and having a sulphur and phosphorus content corresponding to that of hexyl diphenylphosphinodithioate.

Example 11

A mixture of 125 grams (0.5 mole) of diphenylphosphinodithioic acid and 200 ml. (1.6 moles) of n-hexyl alcohol was heated at 155° C. for 12 hours, then allowed to cool. The cooled mixture was washed with aqueous sodium carbonate, dried and distilled. That portion of the distillate which boiled at 190–192° C./0.1 mm., weighed 146 grams (87 percent of the theory) and was shown by elemental analyses to be n-hexyl diphenylphosphinodithioate.

Example 12

A mixture of 70 grams (0.28 mole) of diphenylphosphinodithioic acid, 1.0 ml. (1.1 moles) of n-butyl alcohol and 50 ml. of benzene was heated at 100° C. for 28 hours, then cooled and washed with aqueous sodium bicarbonate. The solution was dried and distilled, yielding 54 grams (63 percent of the theory) of a colorless liquid boiling at 162–164° C./0.07 mm. This liquid was characterized as the butyl ester of diphenylphosphinodithioic acid by elemental analyses.

Example 13

A mixture of 50 grams (0.2 mole of diphenylphosphinodithioic acid and 92 grams (2.0 moles) of ethanol was heated at reflux temperature for 36 hours, then freed of unchanged ethanol by distillation. The residue was washed with aqueous sodium bicarbonate, dried, and distilled. That fraction which boiled at 165–166° C./0.33 mm. weighed 44 grams (82 percent of the theory) and was characterized as ethyl diphenylphosphinodithioate by elemental analyses.

The esters of phosphinodithioic acid disclosed herein are new compounds, and data which relates to their observed physical properties is contained in the table listed below.

ANALYSIS

| | Calcd. | Found | B.P. °C./mm. | M.P. | $n_d^{30}$ | $d^{30}$ |
|---|---|---|---|---|---|---|
| (1) Methyl diphenylphosphinodithioate | P—11.7 / S—24.2 | 11.7 / 23.7 | | 82–83 | | |
| (2) Ethyl diphenylphosphinodithioate | P—11.15 / S—23.04 | 11.06 / 22.84 | 166–167/0.3 | | 1.6600 | 1.1919 |
| (3) n-Butyl diphenylphosphinodithioate | P—10.11 / S—20.89 | 10.26 / 20.76 | 191–192/0.1 | | 1.6377 | |
| (4) 4-methyl-2-pentyl diphenylphosphinodithioate | P / S | | 175/0.2 | | 1.6181 | |
| (5) n-Hexyl diphenylphosphinodithioate | P / S | | 197/0.25 | | | |
| (6) Tert-butyl diphenylphosphinodithioate | P—10.11 / S—20.89 | 10.04 / 20.82 | | 91–92 | | |
| (7) n-Octyl diphenylphosphinodithioate | P—8.54 / S—17.64 | 8.54 / 17.45 | 197–200/9.2 | | 1.6044 | 1.000 |
| (8) n-Decyl diphenylphosphinodithioate | P—7.95 / S—16.40 | 8.01 / 16.46 | 155/0.04 | | 1.5894 | |
| (9) n-Dodecyl diphenylphosphinodithioate | P—7.42 / S—15.32 | 7.10 / 15.02 | 158/0.02 | | 1.5738 | |

Other modes of applying the principle of the invention may be employed, change being made as regards the details described, provided the features stated in any of the following claims, or the equivalent of such, be employed.

We therefore particularly point out and distinctly claim as our invention:

1. The process of preparing dithio-esters of phosphinodithioic acids which comprises preparing a mixture consisting essentially of (a) a phosphinodithioic acid having the following structure:

wherein $R_1$ and $R_2$ are aromatic radicals attached to phosphorus through a benzenoid carbon atom, and (b) an alcohol free of olefinic linkages, and heating said mixture at a temperature within the range of about 50° C. to about 200° C. until the acidity of the mixture is substantially reduced.

2. The process of claim 1 characterized further in that $R_1$ and $R_2$ are aromatic hydrocarbon radicals.

3. The process of claim 1 characterized further in that $R_1$ and $R_2$ are alkyl-substituted aromatic radicals.

4. The process of claim 1 characterized further in that $R_1$ and $R_2$ are chlorophenyl.

5. The process of claim 1 characterized further in that $R_1$ and $R_2$ are alkylphenyl radicals.

6. The process of claim 1 characterized further in that $R_1$ and $R_2$ are phenyl radicals.

7. The process of claim 1 characterized further in that the alcohol is an alkyl alcohol.

8. The process of claim 1 characterized further in that the alcohol is octyl.

9. The process of claim 1 characterized further in that the alcohol is an hexyl alcohol.

References Cited in the file of this patent

UNITED STATES PATENTS

| | | |
|---|---|---|
| 2,653,161 | Ballard et al. | Sept. 22, 1953 |
| 2,659,714 | Harman et al. | Nov. 17, 1953 |
| 2,665,294 | Kosolapoff | Jan. 5, 1954 |